(12) United States Patent
Liu et al.

(10) Patent No.: US 11,872,840 B2
(45) Date of Patent: Jan. 16, 2024

(54) VEHICLE WHEEL HUB

(71) Applicant: CITIC Dicastal Co., Ltd, Qinhuangdao (CN)

(72) Inventors: Weidong Liu, Qinhuangdao (CN); Shiwen Xu, Qinhuangdao (CN); Minglei Li, Qinhuangdao (CN); Liangjian Yue, Qinhuangdao (CN); Jian Li, Qinhuangdao (CN)

(73) Assignee: CITIC Dicastal Co., Ltd, Qinhuangdao (CN)

( * ) Notice: Subject to any disclaimer, the term of this patent is extended or adjusted under 35 U.S.C. 154(b) by 326 days.

(21) Appl. No.: 17/170,812

(22) Filed: Feb. 8, 2021

(65) Prior Publication Data
US 2021/0339562 A1 Nov. 4, 2021

(30) Foreign Application Priority Data
Apr. 29, 2020 (CN) .......................... 202010356363.4

(51) Int. Cl.
*B60B 21/10* (2006.01)
*B60B 3/10* (2006.01)
*B60B 21/02* (2006.01)
*B60B 3/00* (2006.01)
*B60B 3/02* (2006.01)
(Continued)

(52) U.S. Cl.
CPC ............ *B60B 21/106* (2013.01); *B60B 3/005* (2013.01); *B60B 3/02* (2013.01); *B60B 3/10* (2013.01); *B60B 21/023* (2013.01); *B60B 3/16* (2013.01); *B60B 7/06* (2013.01); *B60B 21/02* (2013.01); *B60B 2310/318* (2013.01); *B60B 2360/32* (2013.01); *B60B 2900/111* (2013.01)

(58) Field of Classification Search
CPC ... B60B 21/104; B60B 21/106; B60B 21/023; B60B 21/02; B60B 3/10; B60B 3/16; B60B 7/06; B60B 2310/318; B60B 2360/32; B60B 2900/111; B60B 3/02; B60B 3/005
See application file for complete search history.

(56) References Cited

U.S. PATENT DOCUMENTS

| 4,997,235 A * | 3/1991 | Braungart ............... B60B 25/22 301/11.1 |
| 2004/0066088 A1 * | 4/2004 | Hodges .................... B60B 3/10 301/95.109 |

(Continued)

FOREIGN PATENT DOCUMENTS

DE    102015218038 A1 *  3/2017  ............... B60B 7/04

*Primary Examiner* — Kip T Kotter
(74) *Attorney, Agent, or Firm* — Yong Chen

(57) ABSTRACT

The application relates to a wheel hub for vehicle, which comprises a flange, a rim, a spoke, a central hole, and bolt bores distributed around the central hole. According to the disclosure, the flange on the wheel front side is affixed with an extension part comprising a radial extension magnitude extending to the outer periphery of the wheel hub and an axial extension magnitude extending to the wheel front side, the extension part comprises a plurality of sections circumferentially distributed along the flange, so as to form on the wheel front side an envelope circle having a diameter size increased by twice the radial extension magnitude. The present disclosure further satisfies the additional needs of the user with respect to the overall design of the wheel.

15 Claims, 3 Drawing Sheets

(51) Int. Cl.
  *B60B 3/16* (2006.01)
  *B60B 7/06* (2006.01)

(56) References Cited

U.S. PATENT DOCUMENTS

2006/0202549 A1* 9/2006 Hodges .................... B60B 3/08
                                                  301/5.1
2009/0309410 A1* 12/2009 Hodges .................. B60B 21/04
                                                  301/95.109

* cited by examiner

VEHICLE WHEEL HUB

CROSS-REFERENCE TO RELATED APPLICATIONS

The present application claims the priority of Chinese patent application No. 202010356363.4, filed on Apr. 29, 2020, which is hereby incorporated by reference in its entirety.

TECHNICAL FIELD

The present disclosure relates to a wheel for vehicle, especially a wheel used for an automobile, which is preferably equipped with a pneumatic tire.

BACKGROUND

In recent decades, the requirements of people on the safety and the comfort of automobiles are higher and higher, the weight of a car is increased by 30 percent on average by related additional equipment, and the fuel consumption of the car is correspondingly increased. In order to reduce fuel consumption and $CO_2$ emission, it is one of the most effective ways to reduce the weight of the vehicle, and "unsprung" weight reduction (for example, using a wheel as light as possible while meeting the strength requirement) is an effective means to improve the dynamic performance of the vehicle. With regard to wheel, as the main appearance part, the function part and the safety part of the automobile, the problem of weight-reducing is a key factor for restricting the rapid development of the aluminum alloy wheel, and the wheel manufacturer usually solve the problem of weight-reducing of the wheel through the structural optimization and the way of selecting lightweight materials, but the comprehensive effect is not ideal.

In addition, in automobile manufacturers and automobile refitting industry, it is common to use oversized to improve the performance and appearance of automobile. However, the size of the wheel is limited based on overall vehicle assembly and operational considerations, and it is generally preferred to upgrade the wheel diameter by up to 2 inches, and the size of the wheel must also be matched to the tire specifications, and the tire outer diameter should not change by more than 3%. From the aesthetic point of view of current car users, the "large wheel-thin tire" is generally considered to be more beautiful and have more visual domineering, but the pursuit of the "large wheel-thin tire" has to be subject to the technical standards related to vehicle safety and has to make compromises in terms of fuel consumption, comfort and the like.

At present, a wheel for vehicle, which can take various aspects into consideration and can balance the contradiction between different requirements, is lacked in the market.

SUMMARY

The disclosure aims to provide a wheel for vehicle, which, under the condition of ensuring the normal functionality and safety in the aspects of structure, assembly and operation, further meets the additional requirements of users on the overall design of the wheel, and particularly can realize the "large wheel-thin tire" image expected by the users to the maximum extent, and simultaneously conforms to the weight reduction concept and conforms to the trend of the technical development of automobiles.

Specifically, the disclosure provides the following technical solution:

A wheel for vehicle, having a wheel front side located on an outer side of a vehicle and a wheel back side located on an inner side of the vehicle in a mounting state, a main body of the wheel comprising a flange, a rim, spokes, a center hole, and bolt bores distributed around the center hole, the rim having a diameter and a width suitable for mounting a tire, and two sides of the rim being defined by a flange on the wheel front side and a flange on the wheel back side, wherein an extension part is added (in particular integrally configured) to the flange on the wheel front side, the extension part comprises a radial extension magnitude extending to the outer periphery of the wheel and an axial extension magnitude extending to the wheel front side, the extension part comprises a plurality of sections distributed along a circumferential direction of the flange, thus forming an envelope circle on the wheel front side with the diameter increasing by two times the radial extension magnitude.

The wheel for vehicle is preferably implemented as an aluminum alloy cast or forged wheel, especially for a car wheel equipped with a pneumatic tire. According to the disclosure, apart from the extension part additionally configured (for example integrally formed) on the flange, the remaining parts of the main body of the wheel can remain unchanged. That is to say, for example, the width (J value) and the offset (ET) of the wheel can still adopt the structural configuration parameters originally determined by the automobile or wheel manufacturer, so that the mounting match of the wheel to the tire and to the bodywork (carrosserie) is not affected. Therefore, by means of the flange extension part arranged in a specific manner, the disclosure enables the visual diameter of the wheel to be enlarged after the wheel is assembled, and the visual flatness ratio of the tire to be reduced under the condition that the specification of the tire is not changed, thus the visual impact of "large wheel-thin tire", which is pursued by users, is achieved, the strict limitation of the change dimension of the traditional wheel refitting is avoided, and the possible adverse effect on the whole vehicle performance caused by wheel refitting is avoided.

According to one embodiment, the extension part is axially offset outwards relative to the flange, to provide axial assembly space for the tire, and the value of the axial offset increases with the increase of the axial extension magnitude and the radial extension magnitude. According to this configuration, the outward offset of the extension part can provide a space for fitting the drum portion from the toe area to the sidewall of the tire, so that the wheel allows for a standard tire to be used.

According to another embodiment, the extension part, at a side facing the wheel back side, has a structural profile matching a partial shape of a to-be-assembled tire, so that this side of the extension part is fitted to a toe area of the tire or a corresponding wall surface of a tire side in a state of tire being assembled. According to this configuration, the wheel can be matched with a standard tire, and can also adopt a non-standard tire (e.g. the part thereof matched with the extension part of flange, namely the toe area or the corresponding wall surface of the side wall, is configured into a conformal/follow-up structure).

The radial extension magnitude and the axial extension magnitude of the flange extension part generally cannot exceed the limit values specified by automobile manufacturers, and particularly, the principle that a wheel cannot scratch automobile body parts (especially when a steering wheel is maximally operated) and cannot interfere with obstacles such as road shoulders (considering common road conditions) is taken as a criterion.

The radial extension magnitude may have a value of 0.5 cm to 6 cm, preferably 1 cm to 3 cm.

The axial extension magnitude may have a value of 0 to 5 cm, preferably not more than 2 cm.

Expediently, the extension part comprises 3 to 12 sections distributed along the circumferential direction of the flange, and the sum of (arc) lengths of the sections in the circumferential direction of the flange accounts for 20% to 80% of the total circumference of the flange. In this way, when an envelope circle with a visually larger diameter is formed on the wheel front side, the weight of the wheel will not increase significantly.

Expediently, the number of the sections of the extension part is consistent with the number of the spokes. Therefore, the aesthetic design of the wheel front side can be realized.

Advantageously, a weight reduction recess is configured in an area between a respective spoke and the flange. Therefore, the concept of weight-reducing configuration of wheel is further implemented.

Preferably, an insert made of a plastic material is mounted in the weight reduction recess. These inserts may be configured as decorative parts, if necessary.

The insert can be fixed in the weight reduction recess through a bonding or snap-engaging structure. Thus, the insert is very convenient to be assembled and disassembled and/or replaced.

Figure 1A:
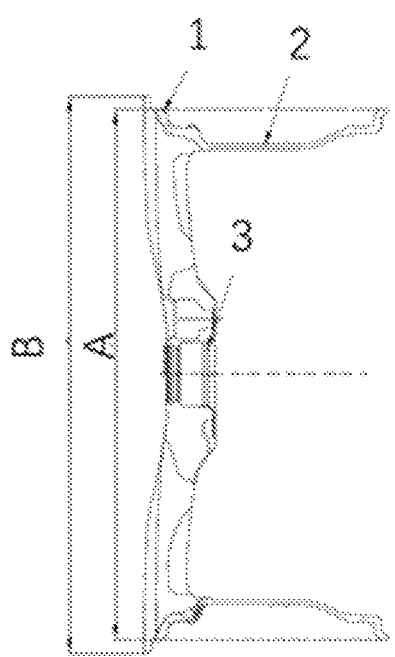
FIG. 1A is a cross-sectional schematic view of a wheel for vehicle of the present disclosure taken along a central axis.

In the figures, 1: flange; 2: rim; 3: center hole; 4: bolt bore; 5: insert; 6: spoke; A: flange diameter; B: diameter of the envelope circle; $1_A$: extension part; 1-1 and 1-1': axial extension magnitude; 1-2: axial offset; 1-3 and 1-3': radial extension magnitude.

DETAILED DESCRIPTION

The technical solutions of the embodiments of the present application will be clearly and completely described below with reference to the accompanying drawings. It is clear that the described embodiments relate only to a part of the embodiments of the present application, and not to all embodiments. All other embodiments obtained by a person of ordinary skill in the art based on the embodiments disclosed in the present application without making any creative effort belong to the protection scope of the present application.

The terms "comprising/including" and "having," as well as any variations thereof, used in the specification and claims of this application are intended to cover a non-exclusive inclusion. For example, a process, method, article, or apparatus that comprises a list of steps or elements is not limited to only those steps or elements but may alternatively include other steps or elements not expressly listed or inherent to such process, method, article, or apparatus. It will be understood by those skilled in the art that throughout the present specification and claims, the terms "axial," "radial," "up," "down," "inner," "outer," and the like are used to refer to an orientation or positional relationship as shown in the drawings, which is used solely to facilitate the description and simplification of the description, and do not indicate or imply that the device, mechanism, structure, or element so referred to must have a particular orientation, be constructed and operated in a particular orientation, and thus the terms are not to be considered as limiting.

Reference herein to "an embodiment" means that specific characteristics, structure, or characteristic described in connection with the embodiment can be included in at least one implementation form of the present application. The appearances of the phrase in various places in the specification are not necessarily all referring to the same embodiment, nor are separate or alternative embodiments mutually exclusive of other embodiments. It is explicitly and implicitly understood by one skilled in the art that the embodiments described herein may be combined with other embodiments.

The details of the configuration of the wheel for vehicle proposed according to the present disclosure will be described in detail below with reference to the accompanying drawings.

Figure 1B:
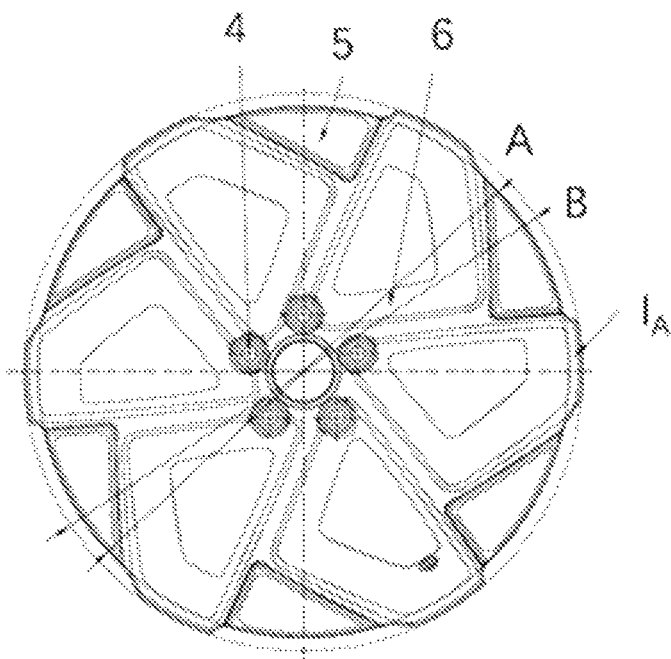
FIG. 1B is a front view of the wheel for vehicle illustrated in FIG. 1A in accordance with the present disclosure.

The present application provides a wheel for vehicle, preferably an aluminum alloy cast or forged wheel, in particular for an automotive wheel equipped with a pneumatic tire. As shown in FIGS. 1A and 1B, the wheel for vehicle has a wheel front side located on the vehicle outer side and a wheel back side located on the vehicle inner side in a mounted state, and the main body of the wheel comprises a flange 1, a rim 2 having a diameter and a width suitable for mounting a tire and having two sides defined by a flange on the wheel front side and a flange on the wheel back side, spokes 6, a center hole 3, and bolt bores 4 arranged distributed around the center hole. According to the disclosure, the flange on the wheel front side is affixed (in particular integrally formed) with an extension part $1_A$ comprising a radial extension magnitude 1-3 extending in a direction towards the outer periphery of the wheel and an axial extension magnitude 1-1 extending in a direction towards the wheel front side, said extension part $1_A$ being made up of a plurality of sections distributed along the circumference of the flange so as to form, on the wheel front side, an envelope circle having a diametral dimension increased by twice the radial extension magnitude 1-3 (see FIGS. 1A and 1B, where it can be seen that the diametral dimension increases from "A" to "B").

According to the disclosure, apart from the extension part additionally configured (in particular integrally formed) on the flange, the other parts of the main body of the wheel can remain unchanged, that is to say, for example, the width (J value) and the offset (ET) of the wheel can still adopt the structural configuration parameters originally determined by the automobile or wheel manufacturer, so that the mounting match of the wheel to the tire and to the bodywork is not affected. Therefore, by means of the flange extension part arranged in a specific manner, the disclosure enables the visual diameter of the wheel to be larger after the wheel is assembled and the visual flatness ratio of the tire to be smaller without changing the specification of the tire, thus achieves the visual impact of a "large wheel-thin tire" aimed by users, without having the strict limitation of the change of dimension (generally, the diameter of the wheel is upgraded by 2 inches at most) as the conventional wheel is refitted, and avoids the possible adverse effect (such as the increase of fuel consumption, the reduction of comfort and the like) on the whole vehicle performance caused by the refitting of the wheel.

Figure 2:
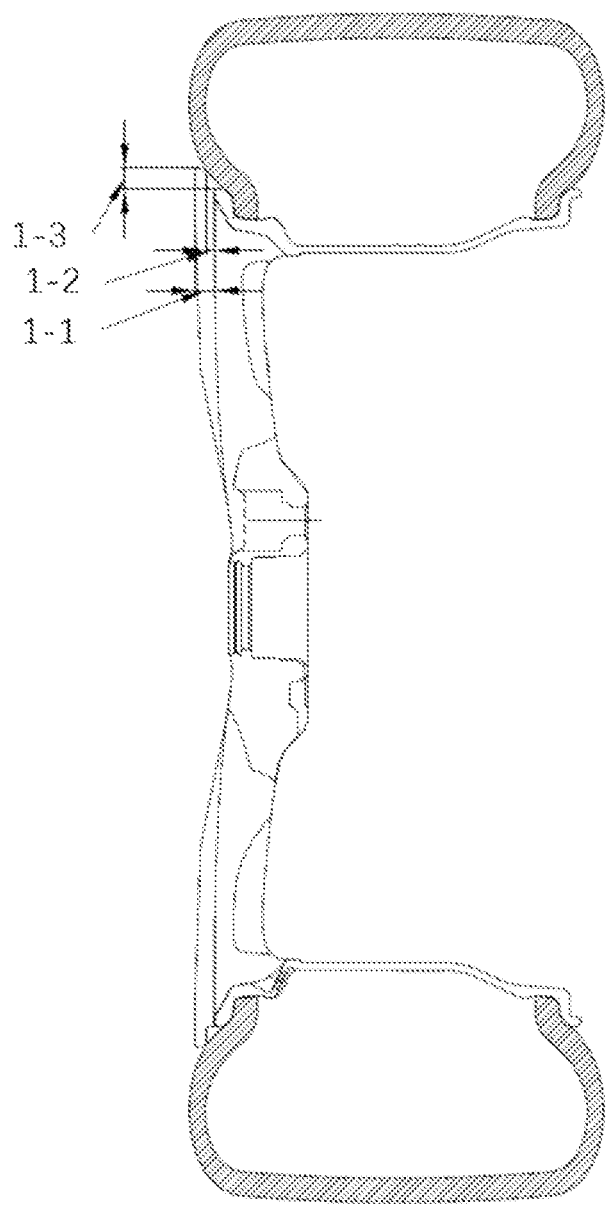
FIG. 2 is a schematic view of a wheel for vehicle together with a fitted tire according to an embodiment of the present disclosure.

According to one embodiment, as shown in FIG. 2, the extension part $1_A$ is axially outwardly offset with respect to the flange to provide an axial fitting space for the tire, the value of the axial offset 1-2 increasing with the axial extension magnitude 1-1 and the radial extension magnitude 1-3. According to this configuration, the outward offset of the extension part provides a space for fitting the drum portion from the toe area to the sidewall of the tire, so that the wheel allows for a standard tire.

Figure 3:
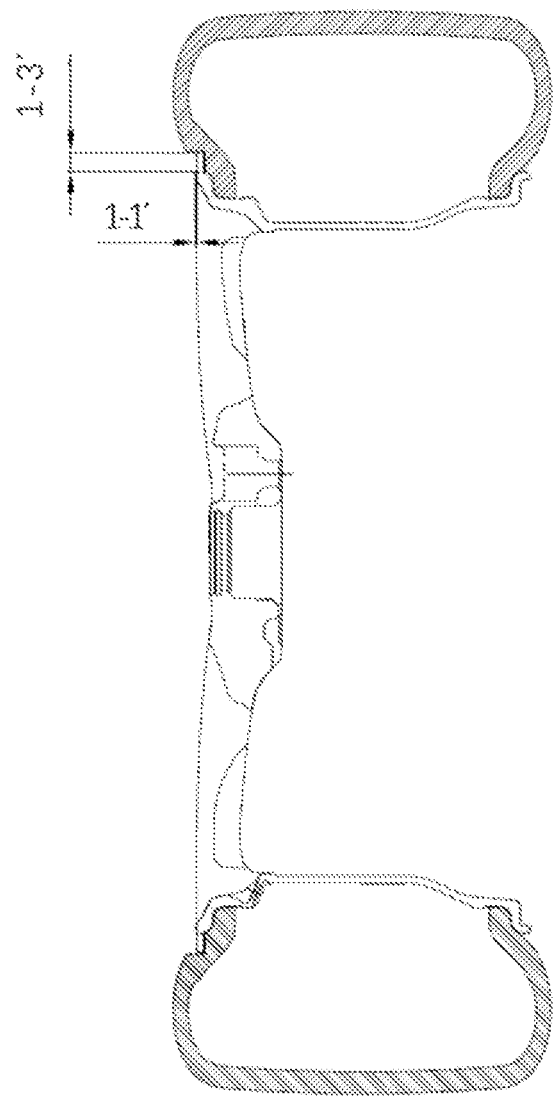
FIG. 3 is a schematic view of a wheel for vehicle together with a fitted tire according to another embodiment of the present disclosure.

According to another embodiment, as shown in FIG. 3, the lateral side of the extension part $1_A$, facing the wheel back side, has a structural profile matching the partial shape of the tire to be assembled, so that this side of the extension part can be applied to the toe area of the tire or to the corresponding wall of the sidewall in a state of tire being assembled. According to this configuration, the wheel can be matched with a standard tire, and can also adopt a non-standard tire (e.g. the part thereof matched with the extension part of the flange, namely the toe area or the corresponding wall surface of the side wall, is configured into a conformal/follow-up structure).

According to the disclosure, the limitation of enlarging the wheel when the conventional wheel is upgraded or refitted can be completely broken through, to a size far exceeding 2 inches. It should be noted, however, that the radial and axial extension magnitude of the flange extension part generally cannot exceed the limits specified by the automotive manufacturers, especially on the principle that the wheel will not scratch the bodywork (carrosserie) components (especially when the steering wheel is maximally operated) and will not interfere with obstacles such as road shoulders (taking into account the general road conditions). The radial extension magnitude 1-3 may be selected from 0.5 cm to 6 cm, preferably from 1 cm to 3 cm. The axial extension magnitude 1-1 may be selected from 0 to 5 cm, preferably not more than 2 cm.

Expediently, the extension part $1_A$ comprises 3 to 12 sections distributed along the circumference of the flange, the sum of the (arc) lengths of these sections in the circumferential direction of the flange being 20-80% of the total circumference of the flange. For example, FIG. 1B shows that the extension part comprises 6 sections evenly distributed along the circumference of the flange. In this way, the weight of the wheel is not increased significantly in the case of an envelope circle with an enlarged visual diameter being formed on wheel front side.

Expediently, the number of sections of the extension part $1_A$ is preferably equal to the number of spokes. As shown in FIG. 1B, an aesthetic design of the wheel front side can be realized.

As shown in FIG. 1B, it is advantageous to form weight reduction recesses in the regions between the spokes 6 and the flange 1. Preferably, an insert 5 made of plastic material is mounted in a weight reduction recess. The insert may be fixed in the respective weight-reduction recess by an adhesive or a snap-fit.

Thus, the present disclosure may actually realize a new concept of weight-reducing configuration for wheel, which includes both visual weight reduction and structural weight reduction.

Regarding the visual weight reduction part, the concept is as follows: the wheel is made visually magnified with a substantially constant weight. As a rule, the size of the wheel, which is visually seen, refers to the flange diameter A. According to the disclosure, on the basis of the universal flange 1, a flange extension part $1_A$ is added, so that the diameter of the wheel is expanded into the diameter B of an envelope circle after the flange extending, as a visual effect, the size of the wheel is enlarged through visual observation, but the actual weight of the wheel is hardly increased.

Regarding the structural weight reduction, according to the disclosure, the area between the respective spoke 6 and the flange 1 is configured as a weight reduction recess, and an insert 5 made of light material is fitted, thus achieving an overall weight reduction of the wheel.

The wheel and the tire, as a whole, are required to be installed on an automobile, and the disclosure can support at least the following two schemes with respect to the assembly of the wheel and the tire:

In a first scheme (i.e., the embodiment shown in FIG. 2), a standard tire is used, the axial offset of the flange extension part $1_A$ is shown as 1-2, which is mainly used for providing the tire with an axial assembly space; the radial extension magnitude 1-3 of the flange extension part is mainly used for providing the tire with a radial assembly space, and the visual diameter B of the wheel is the sum of the flange diameter A and two times the radial extension magnitude 1-3. The axial extension magnitude 1-1 determines the strength of the extension part $1_A$ and must not exceed the limits specified by the respective automobile manufacturers, in order to prevent the wheel from interfering with the road shoulder and the like. The axial offset 1-2 and the axial extension magnitude 1-1 have the same tendency to vary as the radial extension magnitude 1-3.

In a second scheme (i.e., the embodiment shown in FIG. 3), the axial extension magnitude 1-1' of the flange extension part $1_A$ is 0, the extension part $1_A$ extends into the wall surface of the tire and is matched with it, the tire is made into a follow-up tire (non-standard tire), and the portion of the tire, which is matched with the extension part, is configured into a conformal follow-up structure. Likewise, the visual size of the wheel is a sum of the flange diameter and twice the radial extension magnitude 1-3'.

The above description of the embodiments is only intended to help understand the core idea of the present application. It will, of course, be understood by those skilled in the art that various modifications and additions may be made to the specific embodiments described and substituted for those skilled in the art without departing from the spirit of the disclosure or exceeding the scope thereof as defined in the appended claims, in accordance with the teaching of the present application.

What is claimed is:

1. A wheel for vehicle, having a wheel front side located on an outer side of a vehicle and a wheel back side located on an inner side of the vehicle in a mounting state, a main body of the wheel comprising a flange including a first flange on the wheel front side and a second flange on the wheel back side, a rim, spokes, a center hole, and bolt bores distributed around the center hole, the rim having a diameter and a width suitable for mounting a tire, and two sides of the rim being defined by the first flange on the wheel front side and the second flange on the wheel back side, wherein an extension part is added to the first flange on the wheel front side, the extension part comprises a radial extension magnitude extending to the outer periphery of the wheel and an axial extension magnitude extending to the wheel front side, the extension part comprises a plurality of sections spaced apart from each other along a circumferential direction of the first flange, and when viewed from a front view along a direction of a central axis of the wheel, the sections are protruding from the second flange, thus forming an envelope circle on the wheel front side with the diameter increasing by two times the radial extension magnitude; the extension part is axially offset outwards relative to the first flange to provide axial assembly space for the tire, and the value of the axial offset increases with the increase of the axial extension magnitude and the radial extension magnitude.

2. The wheel for vehicle according to claim 1, wherein the number of the sections of the extension part is consistent with the number of the spokes.

3. The wheel for vehicle according to claim 1, wherein a weight reduction recess is configured in an area between a respective spoke and the first flange.

4. The wheel for vehicle according to claim 1, wherein the extension part, at a side facing the wheel back side, has a structural profile matching a partial shape of a to-be-assembled tire, so that this side of the extension part is fitted to a toe area of the tire or a corresponding wall surface of a tire side in a state of tire being assembled.

5. The wheel for vehicle according to claim 4, wherein the number of the sections of the extension part is consistent with the number of the spokes.

6. The wheel for vehicle according to claim 4, wherein a weight reduction recess is configured in an area between a respective spoke and the first flange.

7. The wheel for vehicle according to claim 1, wherein the radial extension magnitude has a value of 0.5 cm to 6 cm.

8. The wheel for vehicle according to 7, wherein the number of the sections of the extension part is consistent with the number of the spokes.

9. The wheel for vehicle according to claim 1, wherein the axial extension magnitude has a value of 0 to 5 cm.

10. The wheel for vehicle according to claim 9, wherein the number of the sections of the extension part is consistent with the number of the spokes.

11. The wheel for vehicle according to claim 1, wherein the extension part comprises 3 to 12 sections spaced aprt from each other along the circumferential direction of the first flange, and the sum of lengths of the sections in the circumferential direction of the first flange accounts for 20% to 80% of the total circumference of the first flange.

12. The wheel for vehicle according to claim 1, wherein the number of the sections of the extension part is consistent with the number of the spokes.

13. The wheel for vehicle according to claim 1, wherein a weight reduction recess is configured in an area between a respective spoke and the first flange.

14. The wheel for vehicle according to claim 13, wherein an insert made of a plastic material is mounted in the weight reduction recess.

15. The wheel for vehicle according to claim 14, wherein the insert is fixed in the weight reduction recess through a bonding or snap-engaging structure.

* * * * *